US008098230B2

(12) United States Patent
Casiez et al.

(10) Patent No.: US 8,098,230 B2
(45) Date of Patent: Jan. 17, 2012

(54) GROUND-BASED HAPTIC INTERFACE COMPRISING AT LEAST TWO DECOUPLED ROTARY FINGER ACTUATORS

(75) Inventors: Gery Casiez, Honnechy (FR); Christophe Chaillou, Lille (FR); Betty Semail, Lille (FR); Patricia Plenacoste, Lille (FR)

(73) Assignees: Universite des Sciences et Technologies de Lille Cites Scientifique, Villeneuve d'Ascq. (FR); Centre National de Recherche Scientifique, Paris (FR)

( * ) Notice: Subject to any disclaimer, the term of this patent is extended or adjusted under 35 U.S.C. 154(b) by 715 days.

(21) Appl. No.: 12/127,251

(22) Filed: May 27, 2008

(65) Prior Publication Data

US 2008/0291168 A1 Nov. 27, 2008

Related U.S. Application Data

(63) Continuation of application No. 10/842,624, filed on May 11, 2004, now abandoned.

(51) Int. Cl.
*G06F 3/033* (2006.01)
(52) U.S. Cl. .......................... 345/167; 345/156; 345/169
(58) Field of Classification Search ........... 345/156–173
See application file for complete search history.

(56) References Cited

U.S. PATENT DOCUMENTS

| 5,095,303 A | 3/1992 | Clark et al. |
| 5,784,052 A | 7/1998 | Keyson |
| 6,128,006 A | 10/2000 | Rosenberg et al. |
| 6,343,349 B1 | 1/2002 | Braun et al. |
| 6,417,638 B1 | 7/2002 | Guy et al. |
| 7,006,074 B2 * | 2/2006 | Chesters ........................ 345/156 |
| 2002/0154094 A1 * | 10/2002 | Serpa ............................ 345/163 |
| 2004/0008186 A1 * | 1/2004 | McAlindon ................... 345/168 |
| 2004/0012557 A1 * | 1/2004 | Daniel ........................... 345/156 |
| 2004/0140953 A1 * | 7/2004 | Kyung et al. ................. 345/163 |
| 2004/0222979 A1 * | 11/2004 | Knighton ...................... 345/184 |
| 2008/0111788 A1 * | 5/2008 | Rosenberg et al. ........... 345/156 |
| 2010/0245249 A1 * | 9/2010 | Ng ................................. 345/166 |

FOREIGN PATENT DOCUMENTS

EP 1 103 883 A 5/2001

(Continued)

OTHER PUBLICATIONS

European Search Report dated Sep. 29, 2003 received in EP Application No. 03 37 0002.

*Primary Examiner* — Nitin Patel
(74) *Attorney, Agent, or Firm* — Miles & Stockbridge P.C.

(57) ABSTRACT

A ground-based haptic interface equipped with at least two decoupled rotary finger actuators adapted to be manipulated with the fingertips of a single hand of a user. For each finger actuator, a means are included for measuring the angular position of the actuator or for measuring the torque applied on the axis of rotation of the actuator. Each rotary finger actuator is associated with a control motor adapted to apply, on the axis of rotation of the actuator, a torque that is a function of the angular position of the actuator, or that controls the rotational position of the axis of rotation of the actuator as a function of the torque applied on this axis. The haptic interface can be used as a peripheral of a computer, for example, for interacting with a virtual environment. It can also be applied to the control or manipulation of real objects by being coupled, for example, with a robot or a manipulating arm. The interface also can be telemanipulated.

5 Claims, 4 Drawing Sheets

FOREIGN PATENT DOCUMENTS

| | | |
|---|---|---|
| EP | 1 128 321 A | 8/2001 |
| FR | 2 767 397 A | 2/1999 |
| WO | WO 96 28777 A | 9/1996 |
| WO | WO 98 51541 A | 11/1998 |
| WO | WO 02 07143 A | 1/2002 |
| WO | WO 02 10899 A | 2/2002 |

* cited by examiner

GROUND-BASED HAPTIC INTERFACE COMPRISING AT LEAST TWO DECOUPLED ROTARY FINGER ACTUATORS

CROSS REFERENCE TO RELATED APPLICATIONS

This application is a continuation of U.S. application Ser. No. 10/842,624 filed May 11, 2004 now abandoned, which is incorporated herein by reference in its entirety.

FIELD OF THE INVENTION

The present invention concerns a novel "ground-based" haptic interface comprising at least two finger actuators, i.e., actuators that can be manipulated with the fingertips of one hand. This interface can be used as a peripheral for a computer or equivalent device, and in this case allows a user to interact with a virtual environment and in particular to manipulate or control virtual objects. The invention is also applicable to the control or manipulation of real objects, because the interface of the invention can be coupled with any type of machine, for example including but not limited to a robot, a manipulating arm, etc.; the interface of the invention can also be used in the field of telemanipulation.

BACKGROUND

The term "haptic" interface commonly designates any man-machine interface that allows force feedback and/or tactile feedback for the user.

The haptic interfaces that can be manipulated with a single hand can be classified into two fundamentally different categories. The first category includes the "ground-based>>" haptic interfaces. In the present text, <<ground-based>> haptic interface designates any haptic interface that generally comprises a structure that is placed on a surface (floor, desk, table, etc.) and that is designed to be manipulated with a single hand. The second category includes the so-called "man-based" interfaces, which are constituted by portable devices designed to be attached to the user. The most common examples of <<man-based>> interfaces are constituted by haptic devices that are attached to one hand, such as force feedback gloves or the haptic devices described, for example, in the publications WO-A-0207143 and WO-A-9851451.

The invention belongs to the field of the haptic interfaces in the first category mentioned above, i.e. "ground based."

In this field, a first example of a known "ground-based" haptic interface is described in the U.S. Pat. No. 6,417,638. This interface is a haptic device with six degrees of freedom (only three of which are motorized) and essentially includes an arm articulated in relation to a fixed base and manipulable by a single hand. This type of haptic device has a very sophisticated design and is therefore very expensive to produce; moreover, this haptic device is bulky and is generally used with the forearm in the air, which makes using the device tiring from a muscular point of view.

A second example of a known "ground-based" haptic interface is described in particular in international patent application WO-A-9628777. The interface described in this publication is used as a 3D computer peripheral and includes a single tactile-feedback actuator that can be manipulated with the fingertips. More particularly, this single actuator is in the form of a ball that can be manipulated by a user. The ball's rotation on itself allows control on two axes X and Y, while control on a third axis Z transverse to the plane (X,Y) is obtained by a vertical translational movement of the ball. Advantageously, this type of <<ground-based>> interface with a single actuator manipulable by the fingertips is not very bulky and can be used with the hand resting at least partially on a surface, which makes it less tiring to use from a muscular point of view, compared to the example of "ground-based" interfaces of the type described in the aforementioned patent U.S. Pat. No. 6,417,638.

SUMMARY

The subject of the invention is a novel haptic interface that is ground-based and can be manipulated by the fingertips of a single hand.

The <<ground-based>> haptic interface of the invention is characterized in that it is equipped with at least two decoupled rotary finger actuators that can be manipulated with the fingertips of a single hand.

Like the haptic interface described in the publication WO-A-9628777, the haptic interface of the invention is not very bulky and can be used with the hand resting at least partially on a surface, which advantageously makes the interface less tiring to use from a muscular point of view. The decoupling of the finger actuators of the interface of the invention advantageously allows a decoupling of each degree of freedom, and thus a better manipulation of the virtual or real objects associated with the interface, compared to the ground-based haptic interface with a single actuator described in the publication WO-A-9628777. Likewise, this decoupling advantageously makes it possible to simplify the mechanical architecture of the interface compared to the mechanical architectures of interfaces with only one actuator, particularly when the interface is equipped with motors or the like for simulating a force feedback and/or a tactile feedback in each degree of freedom. Finally, it is advantageous that the haptic interface of the invention is designed to be manipulated with the fingertips of the hand, since that is the part of the hand that is most sensitive to touch, and thus the part of the hand most likely to sense tactile and/or force feedback.

In a preferred variant of embodiment, the interface includes, for each rotary finger actuator, control means that are designed to apply, on the axis of rotation of the actuator, a torque that is a function of the angular position of the actuator.

BRIEF DESCRIPTION OF THE DRAWINGS

Other characteristics and advantages of the invention will emerge more clearly below in light of the following detailed description of a preferred exemplary embodiment of a haptic interface of the invention, which description is given as a nonlimiting example in reference to the attached drawings in which.

DETAILED DESCRIPTION

Figure 1:
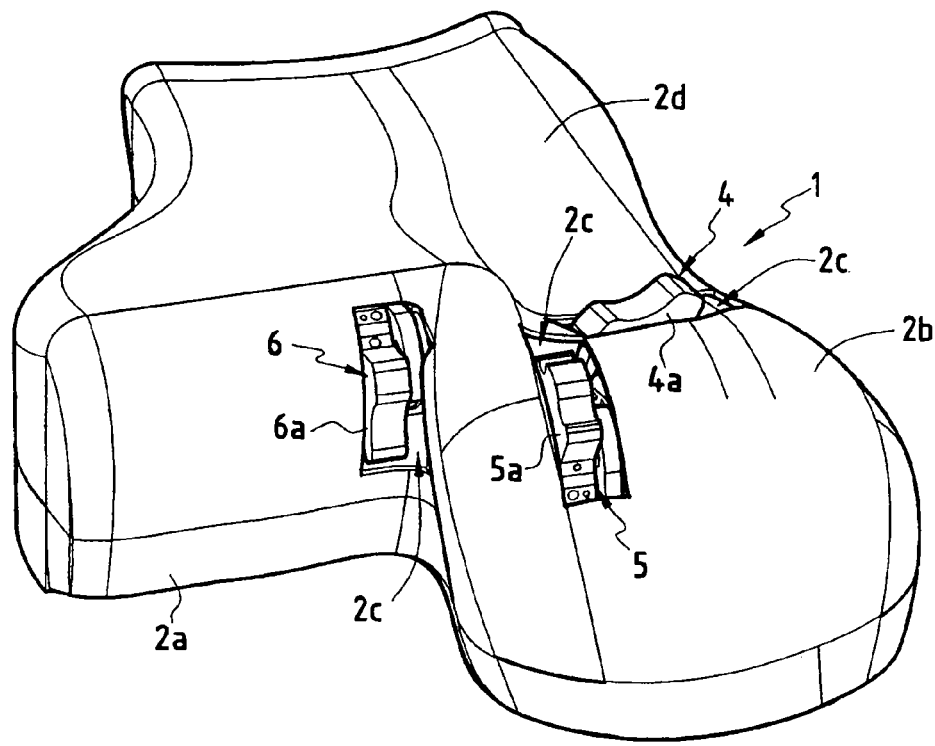
FIG. 1 is a representation in perspective of a ground-based interface of the invention that includes three rotary actuator levers that can be manipulated simultaneously by means of the thumb, the index and the ring finger of one hand.

FIG. 1 represents a preferred variant of embodiment of a haptic interface of the invention. This interface 1 comprises a fixed structure (2a, 2b) which is designed to be placed on a surface such as, for example, a desk or a table, and to which are adapted three force-feedback finger levers 4, 5 and 6, each respectively comprising a rotary finger actuator 4a, 5a and 6a.

The three finger actuators 4a, 5a and 6a are rotating parts and are decoupled from one another. Each rotary finger actuator 4a, 5a or 6a is designed to be actuated by a finger of one hand. Each rotary actuator of a lever 4, 5 and 6 corresponds to a degree of freedom.

Figure 2:
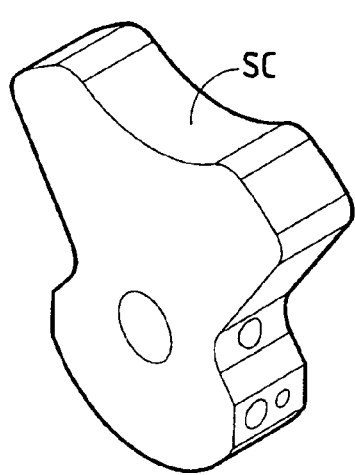
FIGS. 2 and 3 illustrate two exemplary embodiments of a finger actuator.
Figure 3:
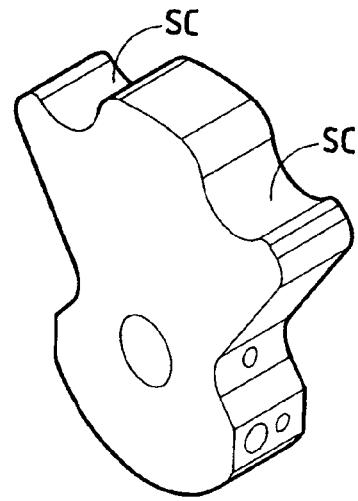

FIGS. 2 and 3 represent two non-exhaustive examples of finger actuators, which are distinguished from one another by the contour of their contact surface SC with the finger. This contour of the contact surface SC of each actuator is designed ergonomically in order to prevent the actuator from slipping from the finger.

In the example illustrated in FIG. 1, which does not limit the invention, the aforementioned fixed structure (2a, 2b) forms a case constituted by a base 2a topped by an attached cover 2b. Preferably, the external surface 2d of the cover 2b, which is designed to come into contact with the palm of the hand, is shaped so as to be ergonomically adapted to the palm of the hand. The cover 2b also includes three openings 2c, the rotary finger actuators 4a, 5a, 6a partially passing through the respective openings 2c of the cover, the remaining part of the structure of each lever being operatively disposed inside the case formed by the base 2a and the cover 2b.

Figure 4:
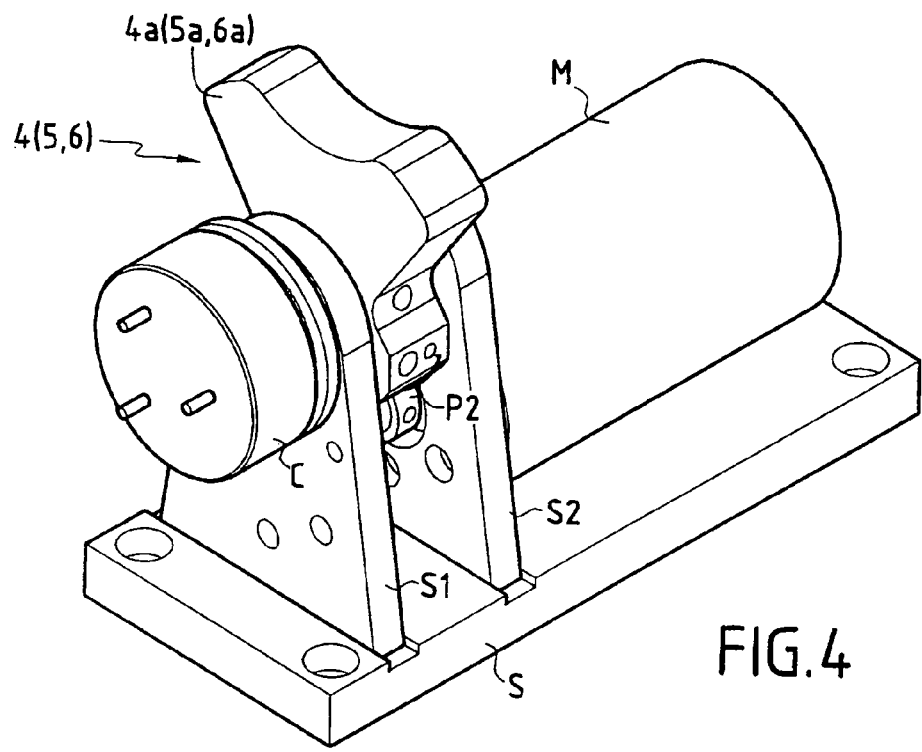
FIG. 4 represents in perspective an assembled lever.
Figure 5:
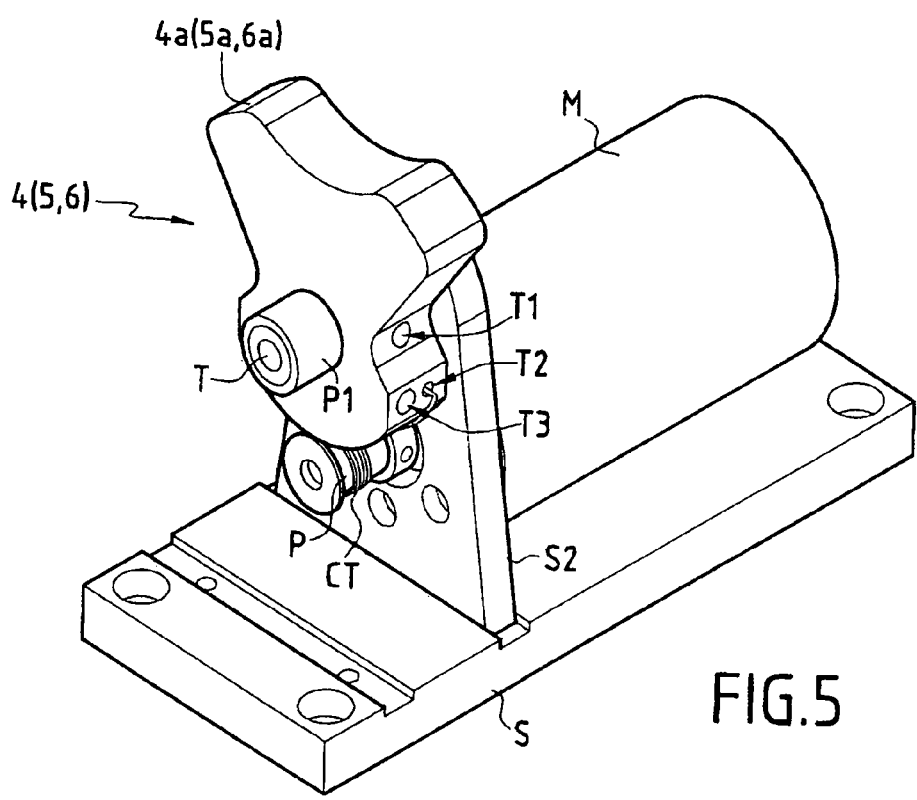
FIG. 5 represents in perspective the lever of FIG. 4, without its angular position sensor.
Figure 6:
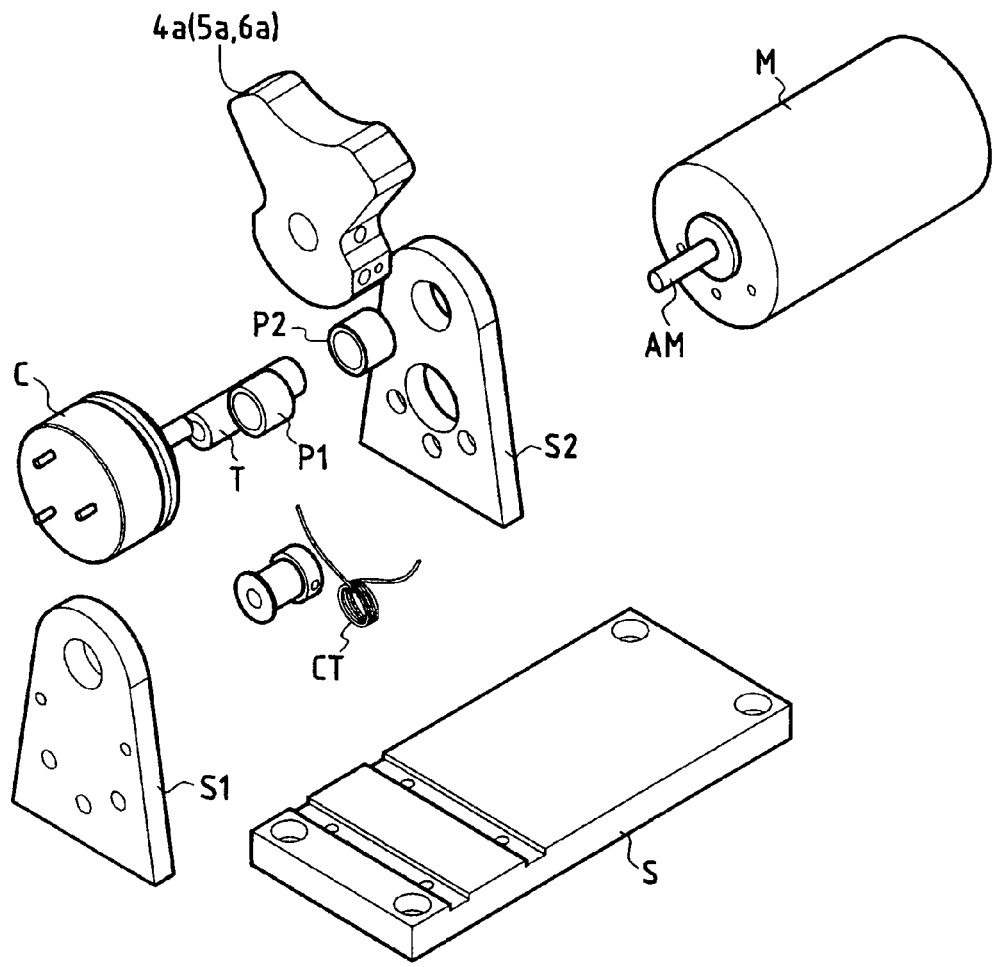
FIG. 6 is an exploded view of the lever of FIG. 4.

FIGS. 4, 5 and 6 represent a particular example of the structure of a lever. In this example, the lever comprises:
- a base S onto which are mounted two parallel supports S1 and S2,
- a motor M, for example a DC motor, which is attached to the support S2 and whose output shaft AM passes through the support S2 and supports a pulley P,
- a hollow rotating rod T mounted freely on the two supports S1 and S2 by means of bearings P1 and P2, the rod running above and parallel to the output shaft AM of the motor M,
- the finger actuator 4a (5a; 6a), which is slid onto the rod T, and which is attached to this rod (T) by means of a screw or the like (non represented) passed through a through hole T1 of the actuator; the actuator 4a and rod T assembly thus rotates, on the axis of the rod T, relative to the supports S1 and S2,
- a transmission cable (CT) wound around the pulley P and passed through the actuator 4a (FIG. 5/through hole T2),
- a means C for measuring the angular position of the actuator that is mounted on the end of rod T.

Preferably, the initial tension of the cable CT is adjustable by means of a tightening screw (not represented) or any other equivalent means passed through the through hole T3 (FIG. 5).

In operation, the measuring means C delivers information characteristic of the angular position of the actuator 4a (5a or 6a). The measuring means C can be embodied by means of any device that makes it possible to measure an angle; it can be for example a potentiometer, a Hall effect sensor, an optical encoder, etc.

The motor M makes it possible to apply a torque on the axis of rotation of the finger actuator, thereby returning a force feedback to the actuator, as will be seen more clearly below.

Figure 7:
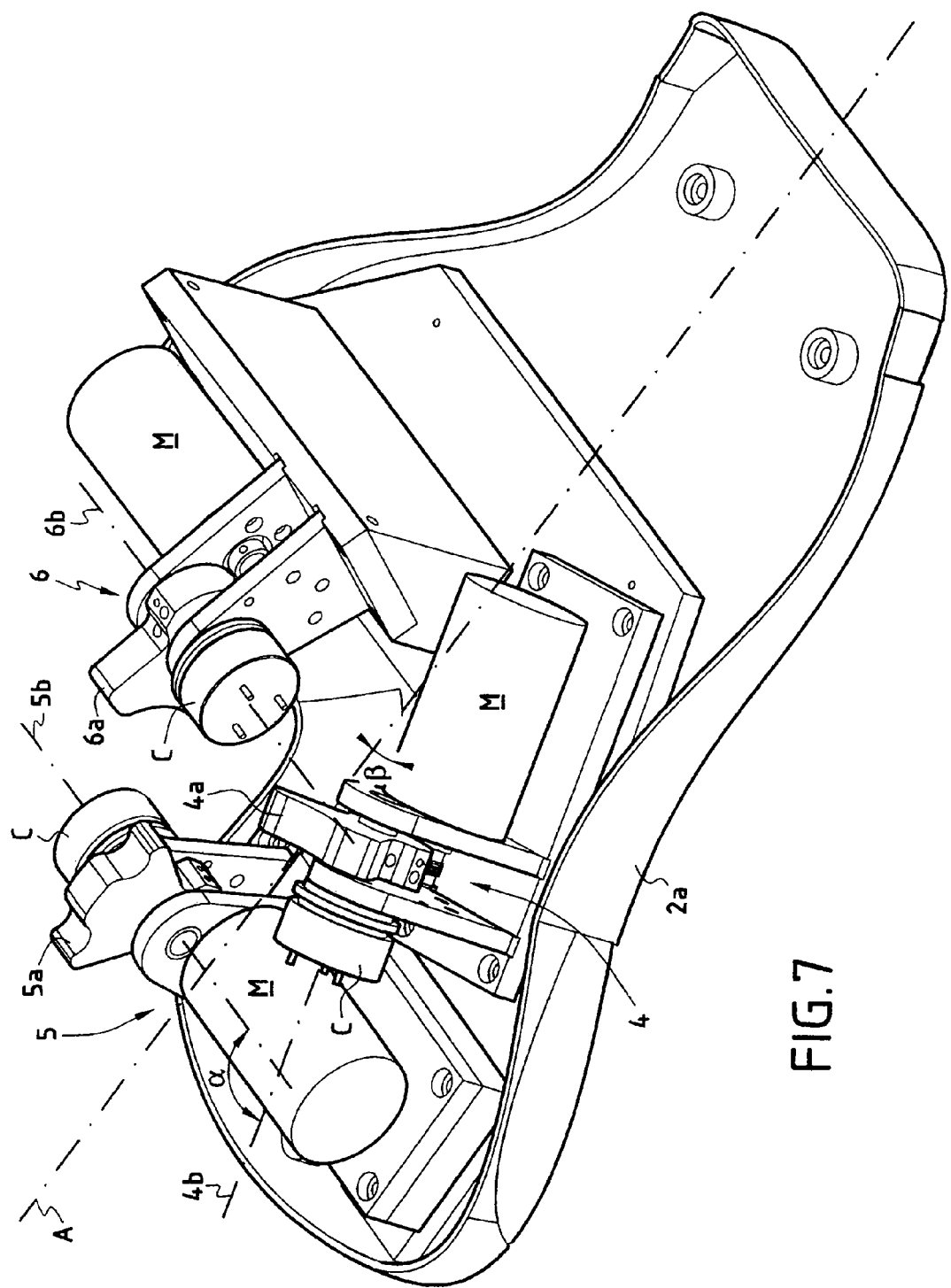
FIG. 7 represents the interface of FIG. 1 without its cover, making it possible to better illustrate the positioning and the mounting of the levers.

FIG. 7 represents the interface 1 without the cover 2b, said FIG. 7 making it easier to visualize the mounting and the positioning of the various levers. In the embodiment of the attached figures, the actuators 4a and 6a of the levers 4 and 6 are identical to the actuator of FIG. 2, while the actuator 5a of the lever 5 is identical to the actuator of FIG. 3. This does not limit the invention. In another embodiment, the actuators could all be identical, or conversely, all different.

The interface is used by placing the wrist in contact with the surface on which the interface is placed, bringing the palm of the hand in contact with the external surface 2d of the cover 2b, and manipulating each actuator 4a, 5a, 6a by rotating it with the fingertips, each finger actuator being manipulable by a single finger of the hand. In another variant of embodiment of the invention (not illustrated), it is conceivable to design an interface whose structure and actuators are designed so that the interface is used with the hand no longer oriented approximately horizontally as in the variant of FIG. 1, but for example with the hand oriented approximately vertically and resting on its edge.

According to a preferred characteristic of the invention, the finger actuators 4a, 5a and 6a are disposed relative to one another in such a way that they can be manipulated simultaneously, respectively by means of the thumb, index finger and ring finger of the same hand. In the variant of FIG. 1, the interface is thus adapted for a right-hander, it being understood that one skilled in the art would immediately reverse the positions of the actuators 4a, 5a and 6a in order to design a left-handed interface.

More particularly, the axes of rotation of the actuators 4a, 5a 6a each have an orientation adapted to the movement of the fingers that manipulate them. Thus, if we consider the interface to have an axis A called the main axis (see FIG. 7) which, during the use of the interface, is approximately parallel to the axis of the user's forearm, the axis of rotation 4b of the actuator 4a, which is designed to be manipulated by the thumb, forms with said main axis A an angle β on the order of 45° so as to maintain the natural angular position of the thumb of the hand relative to the other fingers; the axes of rotation 5b and 6b of the other two actuators 5a and 6a are oriented approximately perpendicular to said main axis A. Thus, the axis of rotation 4b of the actuator 4a is oriented transverse to the axes of rotation 5b and 6b of the other two actuators 5a and 6a; preferably, the axis 4b and the axis 5b (or respectively 6b) form between them an angle α (FIG. 7) that is slightly larger than 90°. In operation, the haptic interface 1 just described is for example connected to a real-time system by means of an input-output card, and said real-time system is connected to a computer running a 3D virtual environment, represented graphically on the screen of the computer. The real-time system primarily makes it possible to control the force feedback to each finger actuator, as will be explained below in reference to FIG. 8. The real-time system also provides the computer with information on the angular position of each actuator, which computer is programmed to transform the angular position information into graphical actions in the 3D graphic environment.

To give a non-exhaustive example, the interface 1 can be used to manipulate virtual objects in a 3D graphic environment, each actuator being associated with a degree of freedom of a movement displayed on the screen. Generally, though not exhaustively, each actuator is for example associated with a translational or rotating movement that can be displayed on the screen.

For example, in translation mode, in order to make the use of the interface intuitive, the rotating movement of the actuator 4a associated with the thumb corresponds to a movement of the manipulated object in the direction of the width of the screen; the rotating movement of the actuator 5a associated with the index finger corresponds to a movement of the manipulated object in the direction of the depth of the screen; and the rotating movement of the actuator 6a associated with the ring finger corresponds to a movement of the manipulated object in the direction of the height of the screen.

In rotating mode, the finger actuators are used for example to rotate the virtual objects around orthogonal axes.

Movements that are more complex than the simple translation or rotation of an object can also be associated with each finger actuator.

No matter what the aforementioned operating mode (translation, rotation, etc.) the interface 1 can advantageously be used in an isotonic or isometric mode. The isotonic mode corresponds to a positional control of the objects to be manipulated; an angular position of each finger actuator corresponds to a position on the screen of the manipulated object. The isometric mode corresponds to a speed control of the objects to be manipulated; each actuator is initially in a neutral position, and when the user moves the finger actuator, a force proportional to the movement is exerted on his finger, by means of an adapted torque applied by the motor M of the lever; each force is associated with a speed.

In a sophisticated variant of embodiment, the interface 1 can be equipped, for each actuator, with a manual operating mode (translation/rotation/etc.) selector, as well as a manual isotonic/isometric mode selector, in order to allow the user to configure the operating mode of each actuator adapted to the application controlled by means of the man-machine interface.

Figure 8:
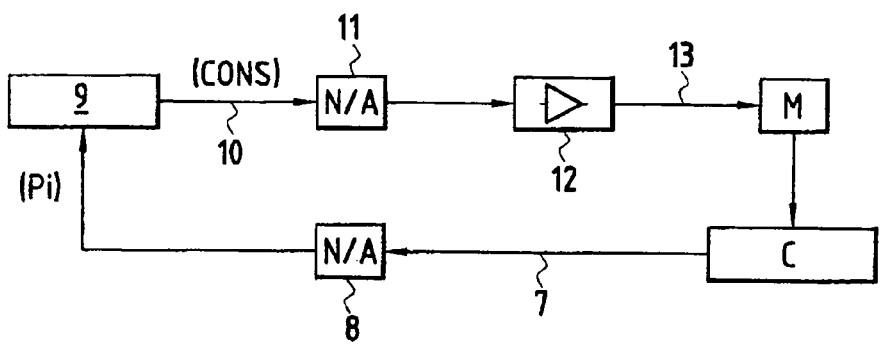
FIG. 8 represents an exemplary control loop of the motor associated with each actuator, which makes it possible to apply on the axis of rotation of the actuator a torque that is a function of the measured angular position of the actuator.

FIG. 8 represents the control loop of a lever that makes it possible to simulate a force feedback to the actuator of the lever. It is important to emphasize that the interface 1 includes three decoupled levers. Consequently, the control of the interface actually includes three parallel control loops like those in FIG. 8 (one control loop per lever).

In reference to FIG. 8, each control loop is an impedance control loop:

having as input to the real-time system 9, the measurements ($p_i$) of the angular position of the finger actuator, which measurements ($p_i$) are output by the measurement means C of the lever, in the form of an analog electrical signal 7 that is converted by an analog-to-digital converter 8, and having as output from the real-time system 9 a digital set point (Cons) (signal 10/FIG. 8) that is converted to an analog signal by means of the digital-to-analog converter 11, then transformed into a control signal 13 for the motor M by means of an amplification stage 12.

The set point (Cons) calculated by the real-time system 9 as a function of the measured angular positions ($p_i$) of the actuator of the lever makes it possible to simulate for the user a force feedback to the actuator that is a function of the command law programmed (Cons=f(pi)). Thus, the control system of each lever makes it possible, by means of the motor M, to apply a torque on the axis of rotation of the actuator that is a function of the angular position of the actuator, the value of the torque depending on the command law programmed.

For example, when a finger actuator is used in isotonic mode, the control system of the lever makes it possible to simulate in the actuator the weight of the objects manipulated, their friction, the encountering of obstacles, etc. It is also possible to simulate a notching effect in the rotation of the actuator. When a finger actuator is used in isometric mode, the torque applied on the axis of the finger actuator is proportional to the angular position of the finger actuator.

The invention is not limited to the particular variant of embodiment just described in reference to the attached figures. In particular, though this is not exhaustive, it is conceivable to produce a simplified ground-based haptic interface comprising only two decoupled rotary finger actuators, or conversely a more sophisticated interface comprising more than three decoupled rotary finger actuators. The control means associated with each actuator in order to apply a torque on the axis of rotation of the actuator are not necessarily motorized, but can, for example in a less sophisticated variant of embodiment, be purely mechanical and exist in the form of an elastic return means like a spring or the equivalent.

The control of each actuator of the haptic interface of the invention is not necessarily implemented by means of impedance control loops, but can also be implemented by means of admittance control loops. In the case of an admittance control loop, the angular position sensor C described above is replaced by a torque sensor that makes it possible to measure the torque applied by the user on the axis of rotation of the actuator; the motor M is positionally controlled so as to bring the actuator to an angular position that is a function of the torque measured by the sensor.

The interface 1 of the attached figures can also be used to manipulate real objects such as a robot, manipulating arm, etc.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein and defined in the claims.

The invention claimed is:

1. A ground-based haptic interface, comprising:
a case having at least two openings and at least two decoupled rotary actuators operatively disposed within the case to extend partially through corresponding openings of the at least two openings in the case for manipulation with fingertips of a single hand,
wherein said ground-based haptic interface further includes, for each said rotary actuator:
torque measuring means for measuring torque applied to an axis of rotation of the rotary actuator; and
control means including a motor that enables rotational positioning of said rotary actuator about its axis of rotation as a function of the torque applied and measured by said torque measuring means.

2. The ground-based haptic interface according to claim 1, wherein a first rotary actuator of said at least two rotary actuators and its corresponding opening are positioned such that the first rotary actuator can be manipulated with a thumb of the single hand, and a second rotary actuator of said at least two rotary actuators and its corresponding opening are positioned such that the second rotary actuator can be manipulated with an index finger of the single hand.

3. The ground-based haptic interface according claim 2, wherein an axis of rotation of the first rotary actuator is oriented transverse to an axis of rotation of the second rotary actuator.

4. The ground-based haptic interface according to claim 1, further comprising: at least a third decoupled rotary actuator.

5. The ground-based haptic interface according to claim 1, wherein the axis of rotation of each rotary actuator is motorized.

* * * * *